GENERATORS TO FORM TELEVISION SYNCHRONIZING SIGNALS

Filed April 12, 1968 9 Sheets-Sheet 1

INVENTOR.
ROGER BRUN
BY
Frank R Trifari
AGENT

INVENTOR.
ROGER BRUN
BY
Frank R. Trifari
AGENT

INVENTOR.
ROGER BRUN
BY
Frank R Trifari
AGENT

GENERATORS TO FORM TELEVISION SYNCHRONIZING SIGNALS

Filed April 12, 1968 9 Sheets-Sheet 4

INVENTOR.
ROGER BRUN
BY
Frank R Trifari
AGENT

INVENTOR.
ROGER BRUN
BY
Frank R. Trifari
AGENT

INVENTOR.
ROGER BRUN
BY
Frank R. Trifari
AGENT

INVENTOR.
ROGER BRUN
BY
Frank R. Trifari
AGENT

INVENTOR.
ROGER BRUN
BY
Frank R. Trifari
AGENT

GENERATORS TO FORM TELEVISION SYNCHRONIZING SIGNALS

Filed April 12, 1968 9 Sheets-Sheet 9

INVENTOR.
ROGER BRUN
BY
Frank R Trifari
AGENT

United States Patent Office 3,526,716

Patented Sept. 1, 1970

3,526,716
GENERATORS TO FORM TELEVISION SYNCHRONIZING SIGNALS

Roger Brun, Paris, France, assignor, by mesne assignments, to U.S. Philips Corporation, New York, N.Y., a corporation of Delaware Filed Apr. 12, 1968, Ser. No. 720,894
Claims priority, application France, Apr. 14, 1967, 102,836
Int. Cl. H04n 5/06
U.S. Cl. 178—69.5 7 Claims

ABSTRACT OF THE DISCLOSURE

A synchronizing signal generator for a television camera is fabricated from commercially available integrated logic circuits. The signals to be combined are developed from a square wave signal by means of logic elements connected as five monostable multivibrators. These signals are combined by means of gates controlled by signals derived from a counter built up from integrated logic circuits.

Figures 1, 2A:
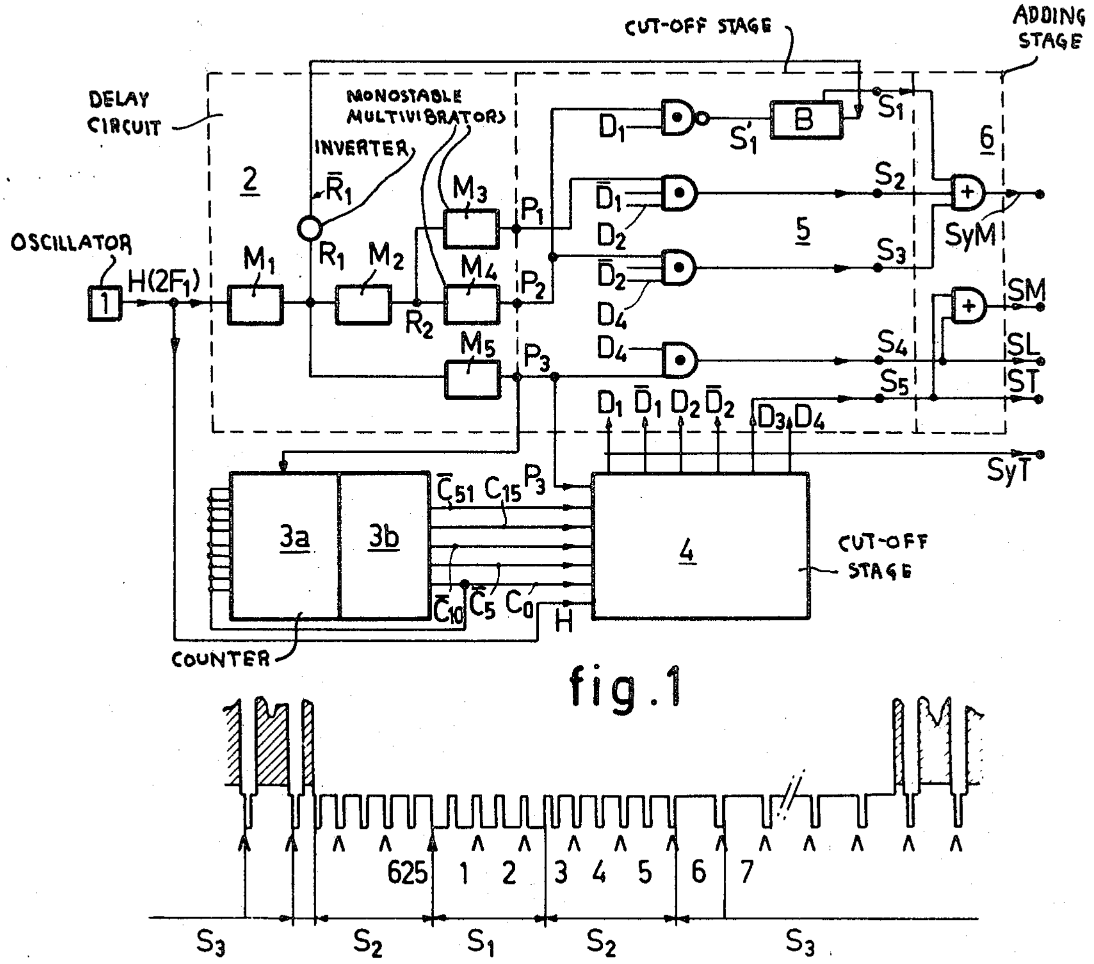

The invention relates to a generator to form television synchronizing signals by means of square-wave signals of substantially constant frequency, termed clock signals.

Such a generator has to deliver separately and simultaneously, preferably at two independent outputs, the following signals:

a line blanking signal (SL),
a frame blanking signal (ST),
a mixed line and frame blanking signal (SM),
a mixed line and frame synchronizing signal (SyM),
a frame synchronizing signal (SyT).

It is known that portable camera devices are generally not provided with synchronizing signal generators and that said signals are usually transmitted to the camera by the transmitter or by a relay station arranged in a vehicle, for example, a van. This involves the disadvantage that it is not possible to control the whole transmission by means of a given camera, which may be very inconvenient, particularly with respect to synchronisation.

A portable assembly of cameras comprises a generator which is carried on the back. Such a camera is built up from discrete components, which are interconnected in a conventional manner, that is to say by a great number of solderings and its reliability in operation is therefore limited.

It is now known that the computer industry has developed integrated logic circuits for accurately defined functions on the basis of logical data. These circuits are commercially available. However, their functions do not correspond to the requirements characteristic of television and in view of the comparatively small number of television cameras to be employed for public broadcasts it is not possible to manufacture perfectly appropriate circuits for economic reasons.

The signals generator according to the invention is therefore designed, in contrast to the known generators, on the basis of commercially available, modern electronic logic circuits, and not on the basis of an assembly of components having characteristics matching the functions. This involves the use of more expensive means than would theoretically be necessary, but this disadvantage is largely compensated for by the lower costs of the mass-produced integrated micro-circuits.

The present invention has for its object to provide a synchronizing signal generator which can be integrated in the body of a camera.

The generator for the formation of signal sequences by means of an oscillator producing square-wave signals of a given frequency is characterized in accordance with the invention in that the generator comprises the following stages:

(a) a delay stage comprising five monostable multivibrators, each composed of an And-gate, a phase inverter and a Nor-gate and each provided with the required RC-elements for adjusting the desired delay period for each monostable multivibrator, in which the first and the second multivibrators are connected in series and the output of the second multivibrator is connected to the input of the third and of the fourth multivibrator and the output of the first multivibrator is also connected to the input of the fifth multivibrator, whilst the square-wave signal (H2F1) is applied to the input of the first multivibrator, (b) a dividing stage comprising a number of counters composed of Nand- and Or-gates whose input is connected to the output of the fifth monostable multivibrator and whose five outputs are connected to five inputs of (c) a first cut-ofl stage comprising a sixth input to which is applied the square-wave signal H2F1 and a seventh input connected to the output of the fifth monostable multivibrator and comprising six outputs, five of which are connected to five inputs of (d) a second cut-off stage comprising a Nand-gate, three And-gates and a flip-flop, the two inputs of the Nand-gate being connected to the first output of the first cut-off stage and the output of the fourth monostable multivibrator respectively, whereas the output of said Nand-gate is connected to the first input of the flip-flop, whose other input receives the output signal of the first monostable multivibrator, whilst the three inputs of the first And-gate are connected to the output of the third monostable multivibrator, to the second and to the third outputs respectively of the first cut-off stage and furthermore the three inputs of the second And-gate are connected to the output of the fourth multivibrator, to the fourth and to the sixth outputs respectively of the second cut-off stage, whilst finally the two inputs of the third And-gate are connected to the output of the fifth multivibrator and to the sixth output respectively of the second cut-off stage, whilst the first of the four outputs of the second cut-off stage is formed by the output of the flip-flop, the second output is formed by the output of the first, the third output is formed by the output of the second and the fourth output is formed by the output of the third And-gate, said four outputs leading to (e) an adder circuit comprising two Or-gates, the three inputs of the first Or-gate being connected to the three first outputs of the second cut-off stage, whereas the two inputs of the second Or-gate are connected to the fourth output of the second cut-off stage and to the fifth output of the first cut-off stage and the output of the first Or-gate delivers the over-all television synchronizing signal and the output of the second Or-gate supplies the line- and frame-blanking signal.

The generator according to the principle of the invention is based on the recognition of the fact the generator is capable of providing the desired television synchronizing signal by means of an oscillator producing the square-wave signals via a number of monostable multivibrators having each a different delay time in returning from the unstable state to the stable state and via a number of And-, Nand-, Or- and Nor-gates. It will be apparent from the following description that moreover said monostable circuits themselves are formed from said gate circuits.

Further advantageous features of the invention will be obvious from the following description of a particular embodiment given solely by way of example.

It appears to be useful to insert in this description some explanation of logic functions of the integrated circuits, which are known but which will facilitate the good understanding of the invention by those skilled in the art who have to be television experts who will be familiar only with the conventional television circuits.

Figure 2B:
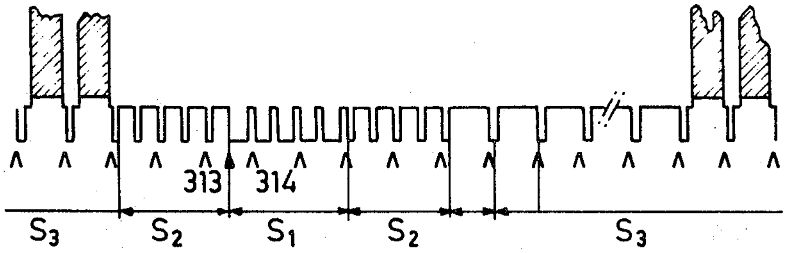
Figure 3:
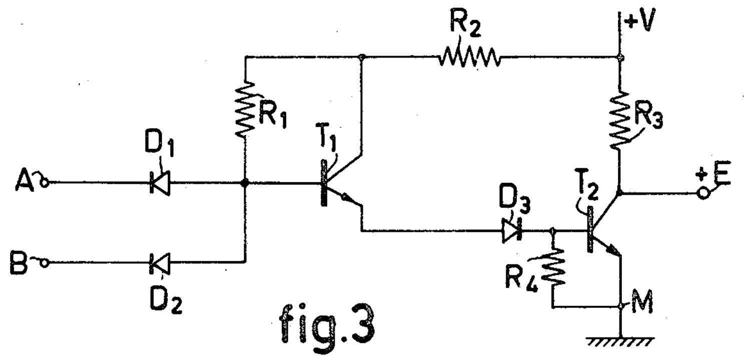
Figure 4A:
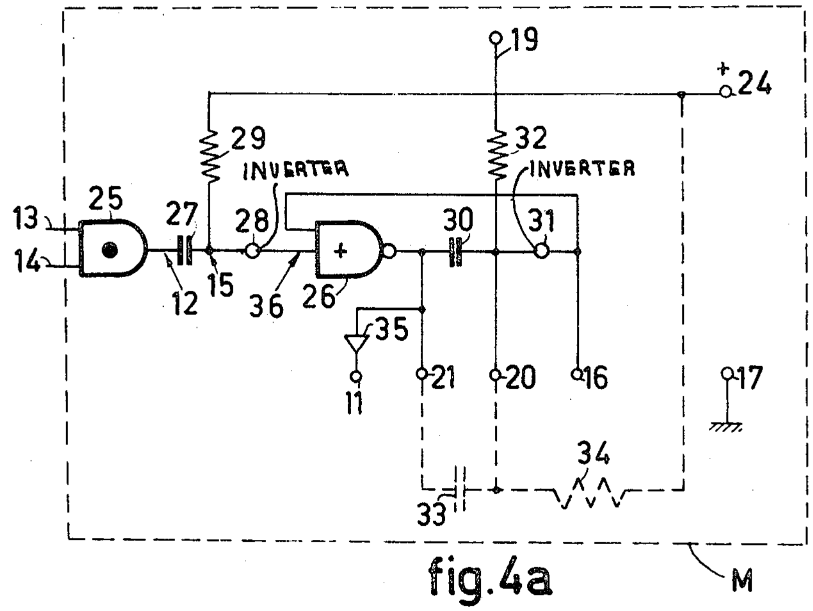
Figure 4B:
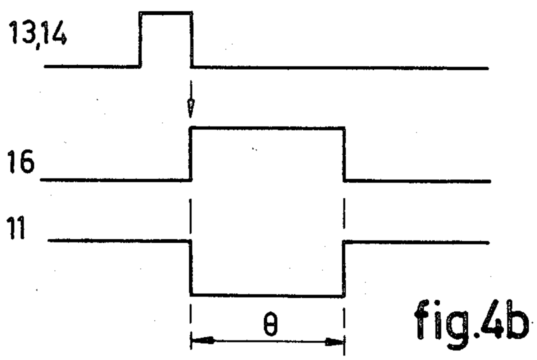
Figure 5:
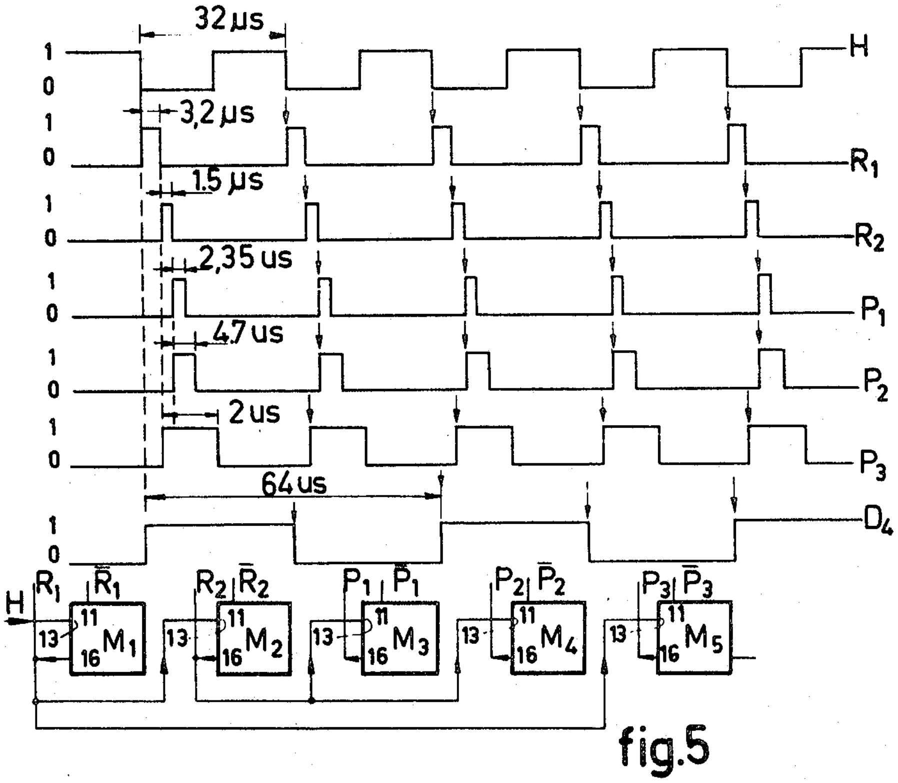
Figure 6A:
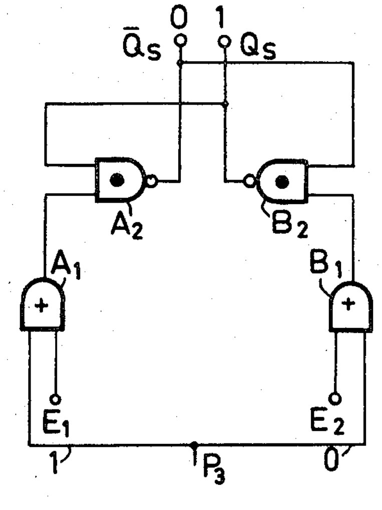
Figure 6B:
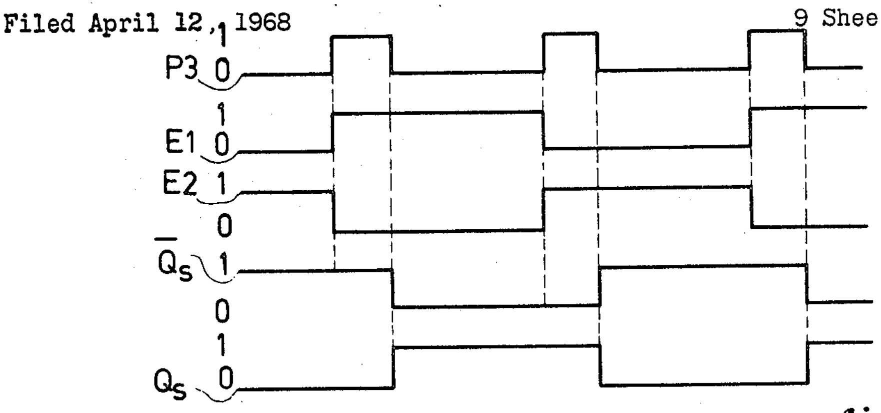
Figure 6C:
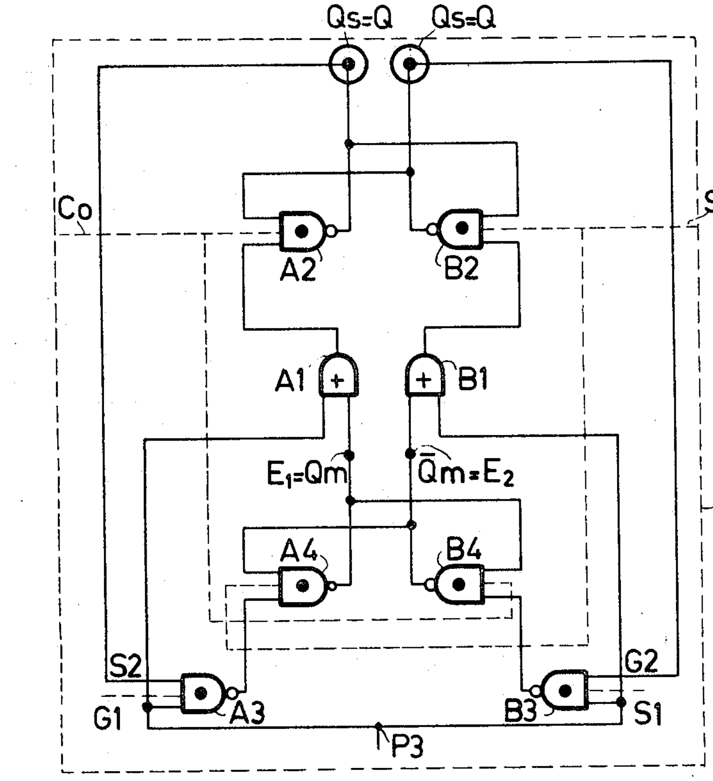
Figure 6D:
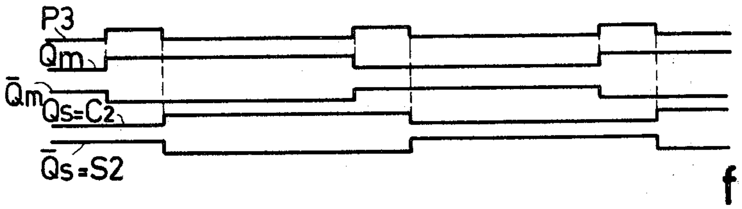
Figure 7:
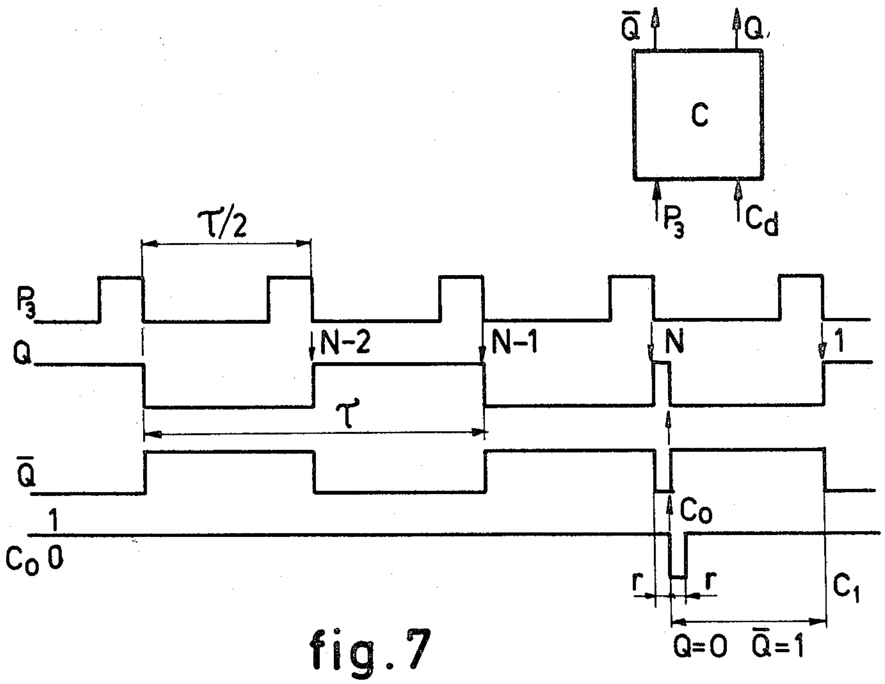
Figure 8:
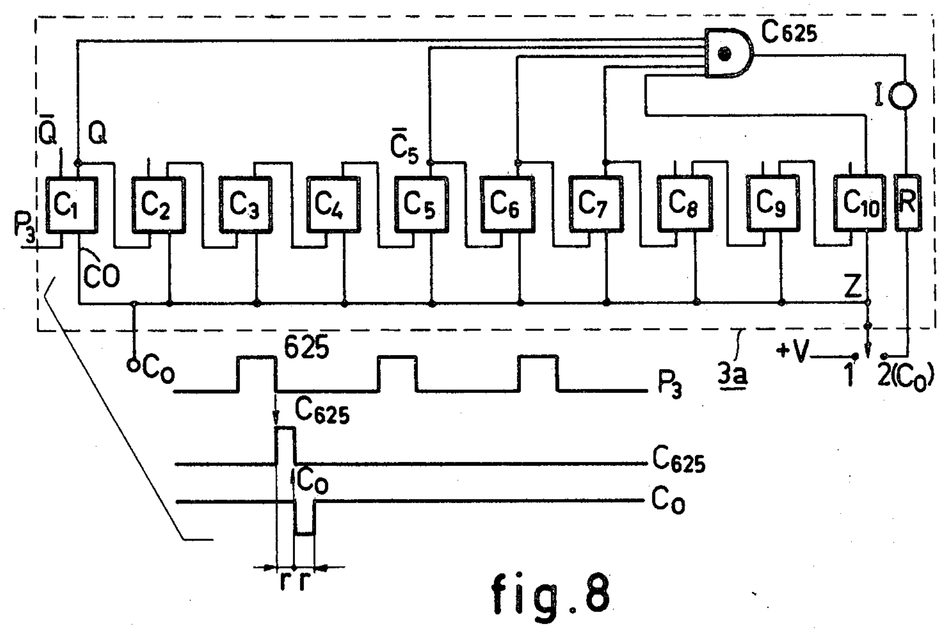
Figure 9A:
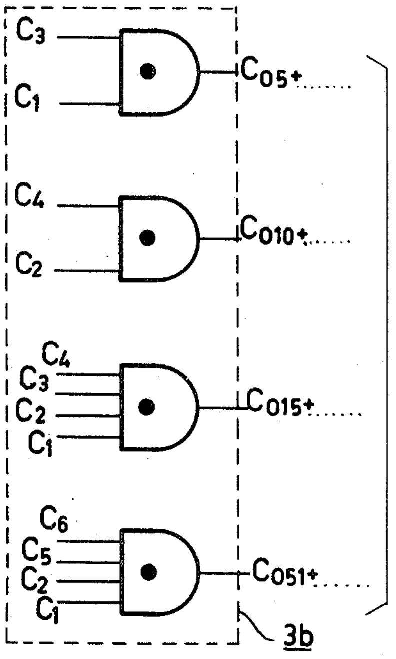
Figure 9B:
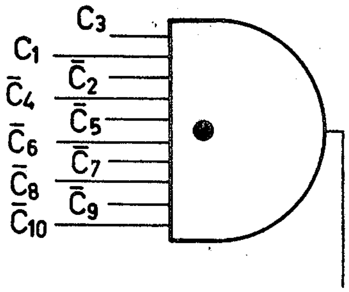
Figure 9C:
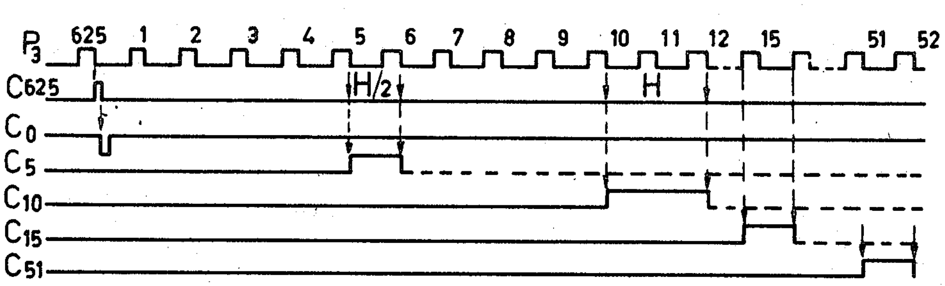
Figure 10:
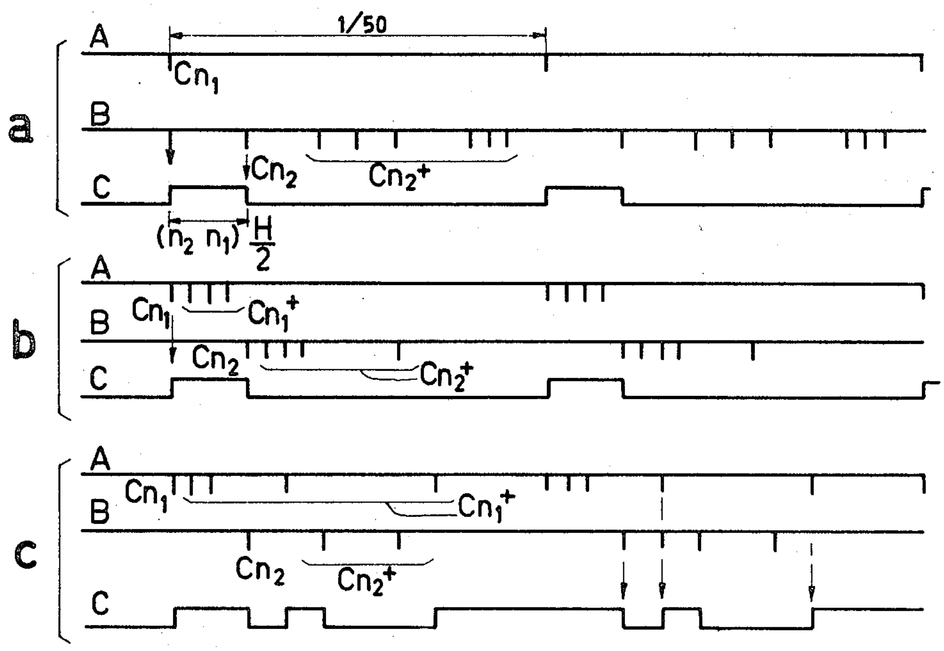
Figure 11:
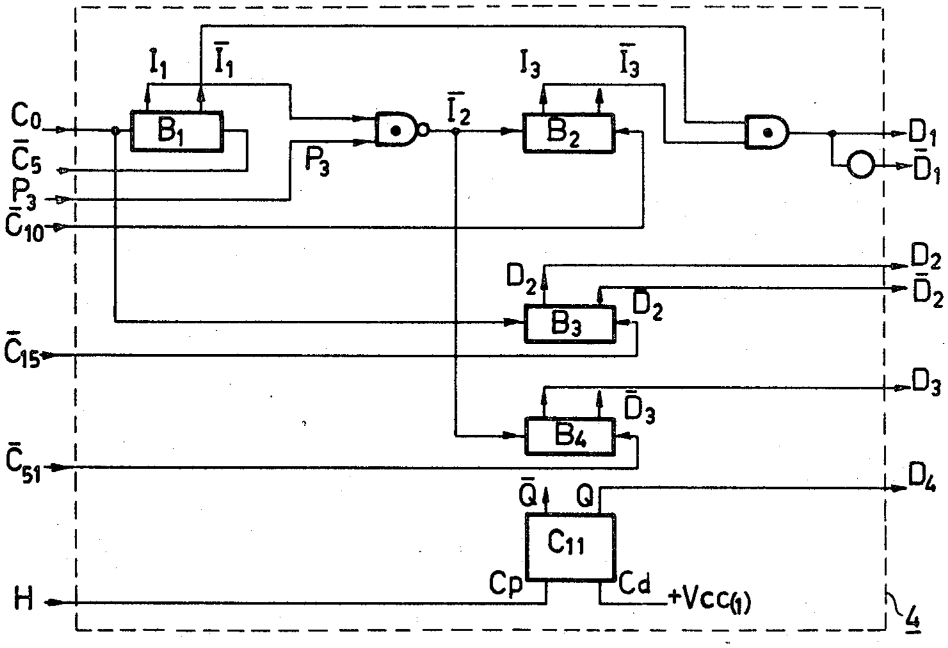
Figure 12:
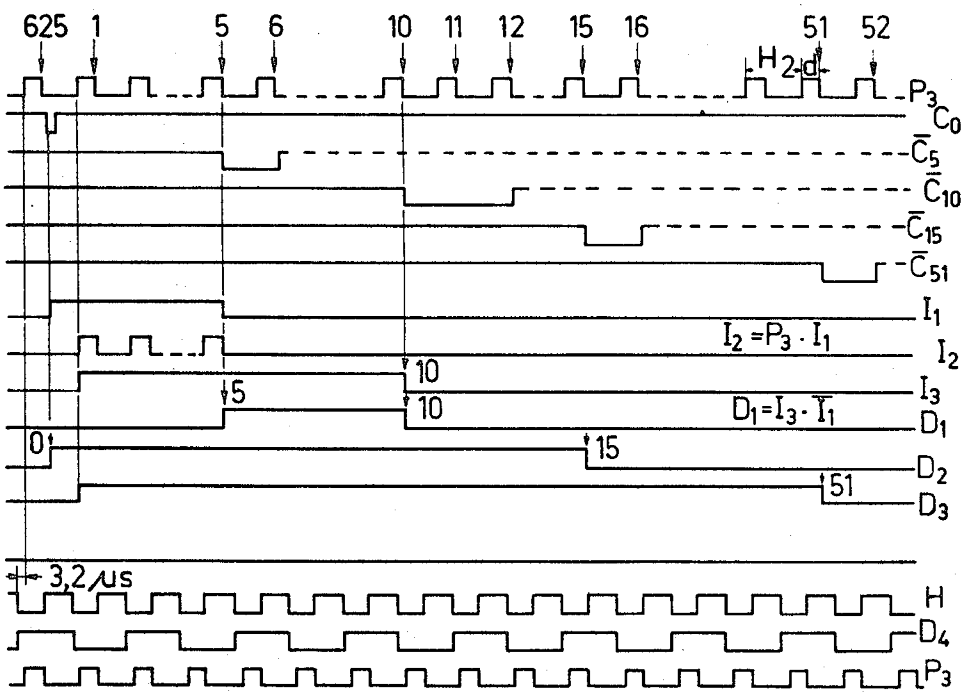
Figure 13:
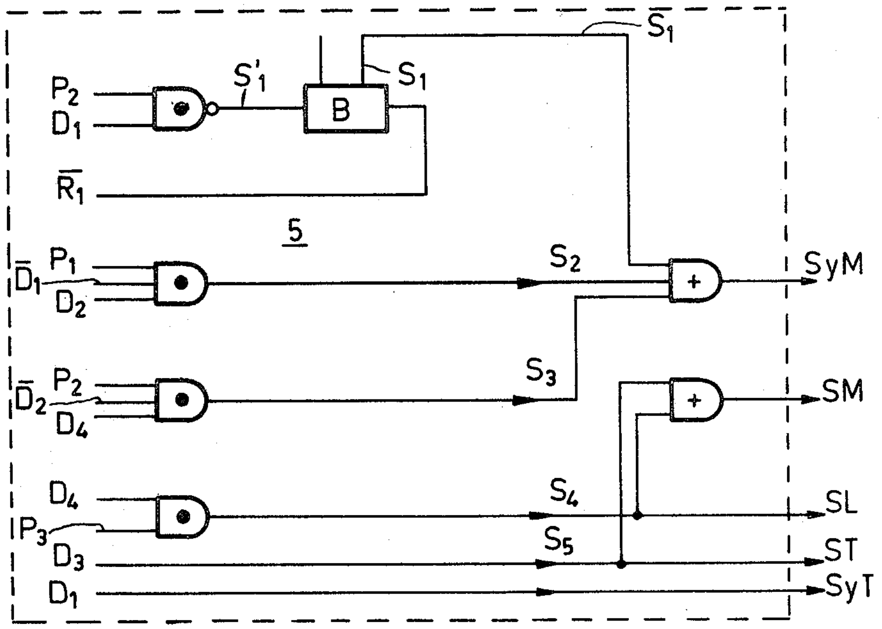
Figure 14:
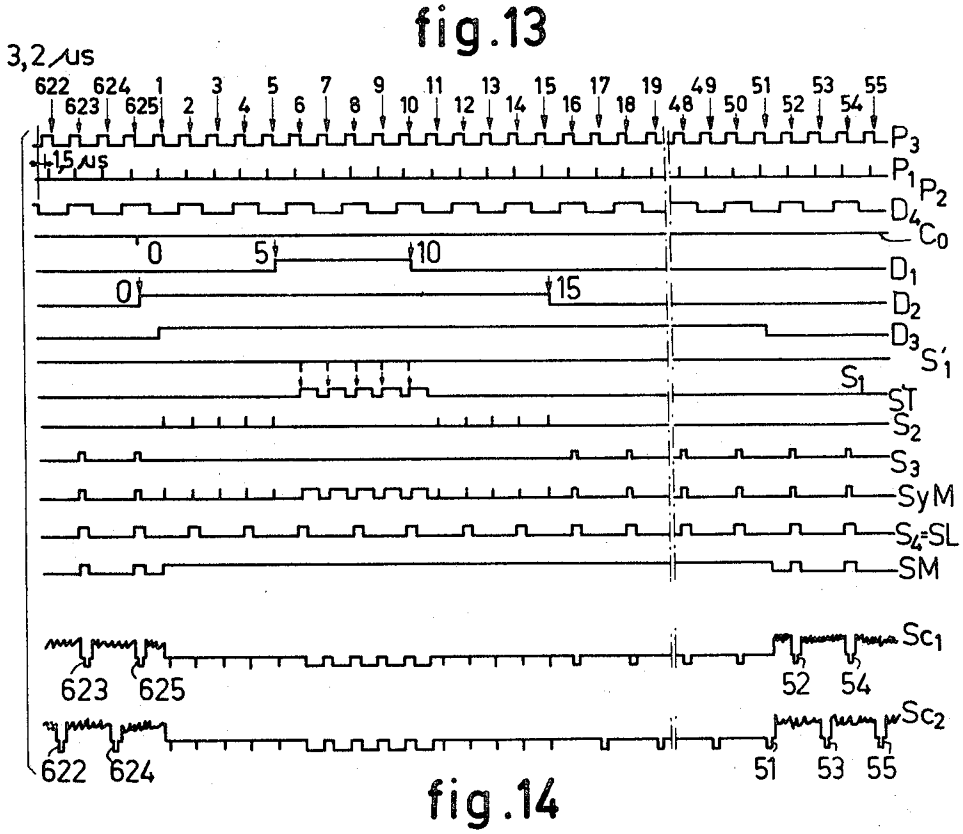

FIG. 1 shows a simplified block diagram of the generator assembly, the structures of some stages being shown in detail, FIGS. 2*a* and 2*b* illustrate synchronizing signals with the desired frame frequency, FIG. 3 shows an asymmetric flip-flop, the waveform of signals obtained in a special use and the electric diagram of a Nand-gate of the type employed in a flip-flop, FIG. 4*a* shows a bistable circuit and FIG. 4*b* illustrates the waveform of the signals obtained by the application of a signal to one of the input terminals of said bistable circuit, FIG. 5 shows the waveform of the primary signals obtained by the series connection of a plurality of monostable circuits and the scheme of the connections of said monostable multivibrators, FIG. 6*a* shows a repeater circuit, FIG. 6*b* illustrates the signals at the outputs of the repeater circuit of FIG. 6*a*, FIG. 6*c* shows a master-slave device connected like a JK-type obtained by the combination of a symmetric flip-flop and a repeater circuit as shown in FIG. 6*a*, FIG. 6*d* illustrates the signals at the outputs of the master-slave device of FIG. 6*c*, FIG. 7 shows a binary counter C of the kind shown in FIG. 6*a* and illustrates the input and out signals thereof, FIG. 8 shows the mode of connection of the binary counters $C_1$ to $C_{10}$ and the waveform of the resultant signals, FIG. 9*a* shows the mode of connection of the And-gates for obtaining the desired coincidence pulses, FIG. 9*b* shows an And-gate having ten inputs for obtaining a single coincidence pulse, FIG. 9*c* shows the appearance of the various pulses forming the sub-sequence, FIG. 10 shows various cases in which false coincidences are made, FIG. 11 shows the cut-off stage for supplying the cut-off signals, FIG. 12 is an explanatory diagram of the operation of the cut-off stage of FIG. 11, FIG. 13 shows the second cut-off stage to form the signals forming the various sequences, and FIG. 14 illustrates the various resultant signals.

The particular embodiment to be described hereinafter is a generator for a camera to be operated on the CCIR standard of 625 lines, but according to circumstances the device may operate on any standard including slow rhythm standards for space purposes or military purposes.

The pilot oscillator 1 of FIG. 1 supplies a frequency equal to double the line frequency, in this case 31,250 c./s. It serves to supply the clock frequency of the generator, termed hereinafter the signal H. (2F1). The design of this oscillator 1 falls out of the scope of the present invention; it will be assumed that the supplied signal is a square-wave signal of a frequency 2F1 and of a level matching the load circuits. By means of this signal primary signals ($P_1$, $P_2$ and $P_3$) of appropriate delay and width are formed in the delay stage 2. One of the primary signals is applied to the coincidence counter 3, which supplies the coincidences (signals C). Said signals C are used for the formation of cut-off signals in the first cut-off stage 4 (signals D). The primary signals P, with the exception of that applied to the counter 3, are cut off in the second cut-off stage 5 for the formation of subsequences which furnish the signals $S_1$, $S_2$, $S_3$, $S_4$ and $S_5$. The addition of a plurality of subsequences in the adding stage 6 provides one sequence. The frame blanking signals ST and the frame synchronizing signals *Sy*T are already available in the form of cut-off signals at the output of the stage 4. Impedance matching devices are, of course, connected between the output and the further stages.

FIG. 2 illustrates the waveform of the synchronizing signals to be obtained in the case of the standard of 625 lines (CCIR) chosen here by way of example. This waveform results from known adopted standards and hereinafter only those values will be referred to which are required for a good standing of the invention.

FIG. 2*a* illustrates the signal at the beginning of the odd-numbered frames and FIG. 2*b* the signal at the beginning of the even-numbered frames.

Given signals are formed by pulse sequences produced every 1/50th second; for example, the combined line and frame synchronizing signal (SyM) is formed by three sequences.

$S_1$ is the sequence of the frame synchronizing pulses (five pulses), width 27.3$\mu$, S±0.03 repetition or period $H/2$ with double the line frequency 2F1, $S_2$ equalisation sequence divided into two portions (5 pulses of pre-equalisation, 5 pulses of post-equalisation), width 2.35$\mu$, S±0.15 repetition period $H/2$, $S_3$ line synchronizing sequence, width 4.7$\mu$sec. repetition period H with the line frequency F1.

It will be apparent that the flank of the first pulse of $S_1$ coincides with the flank of the pulse of the 625th line at the beginning of the odd-numbered frames, whereas it is located between the 313th and 314th line pulses with the even-numbered frames.

FIG. 3 shows by way of example the electronic diagram of a known Nand-gate which, however, will contribute to a good understanding of the operation of such a gate.

As a matter of course, this gate may be replaced by any device permitting of carrying out the logic operations described above in the positive logical system adopted here.

The two input terminals A and B permit of energizing separately two diodes $D_1$ and $D_2$. The anodes of these two diodes are connected to the base of a first transistor $T_1$. The emitter of $T_1$ is connected to the anode of a diode $D_3$, the cathode of which is connected to the base of the transistor $T_2$. The symbol +V indicates the positive voltage source, for example, +5V; M designates the earth connection of the arrangement; E is the output terminal and $R_1$, $R_2$, $R_3$, $R_4$ are polarising resistors.

$T_1$ and $T_2$ are cut off ($E=1$), when the diodes $D_1$ and $D_2$ are simultaneously conducting, so that A=B=0. The conduction of a single diode ($A$ or $B=1$), is not sufficient for releasing $T_1$ ($E=0$). The cut-off signals can be obtained by means of such an asymmetrical flip-flop. If from a signal P having a period $\tau$ two isolated pulses are derived, one of which $C_0$ is a reference signal and the other $C_n$ differs by a duration $n$T from the former, it is possible to obtain a cut-off signal of a duration $\tau$. The pulses $C_0$ and $C_n$ are termed coincidence pulses.

The various coincidence signals $C_0$, $C_n$, $C_{n1}$ are derived by means of a counter 3, which serves for producing a reference pulse $C_0$ every 625 input signals of a period $H/2$ with double the line frequency 2F1=31,250 c./s., that is to say the frequency of the signal $C_0$ is equal to 31,250/625=50 c./s., that is the frame frequency F*tr*, for producing the coincidence pulses $C_{n1}$, $C_{n2}$, spaced apart by $$n\cdot\frac{H}{12}n\cdot\frac{H}{22}$$

of the reference signal $C_0$.

This counter will be termed herein coincidence counter. It comprises:

a binary counter having 10 stages, the counting capacity being $2^{10}=1024$, hence higher than 625;

interpretation circuits or coincidence gates forming $C_0$ (origin for the other coincidences and limitation of counting to 625 by resetting the counter to zero and the coincidences $C_{n1}$, $C_{n2}$ required for obtaining the cut-off signals).

FIG. 1 shows the various stages so that the mode of operation of some of them will be apparent. As described above, the oscillator 1 of known type supplies a square-wave signal of a frequency 2F1 and a level matching the further circuits.

It will be apparent from FIG. 1, that the delay stage 2 comprises a number of monostable circuits $M_1$, $M_2$, $M_3$, $M_4$ and $M_5$ by means of which from the squarewave pulses H(2F1) obtained from the generator 1 primary signals $R_1$, $R_2$, $P_1$, $P_2$, $P_3$ are formed. It should be noted that a character having a dash above it designates an inverted signal. For example $\overline{R_1}$ of FIG. 1 indicates the inverted signal $R_1$. It will be seen from FIG. 5, in which these signals are illustrated, that one monostable circuit excites the other so that relatively delayed signals are obtained. The delay time of each monostable circuit, which is determined in known manner by an RC time constant can be adjusted for each individual monostable circuit in order to obtain the desired delay with respect to the television synchronizing signals to be formed.

A possible embodiment of such a monostable circuit M is shown in FIG. 4*a* and FIG. 4*b* illustrates the input and output signals thereof.

The monostable circuit M is of a commercially available type, in which the terminals of the RC-elements are passed out of the casing so that various combinations can be made and the value of the time constant can be fixed. It is known that a monostable circuit has a single stable state, termed, the initial state. When this initial state is changed, the circuit returns thereto at the end of a controllable time, which is, however, not infinite. The "memory" of the monostable circuits is therefore limited. The duration $\theta$ of the return to the initial state is determined by the values of the internal and external RC-elements. The monostable circuit shown in FIG. 4*a* is formed by an And-gate 25, comprising two input terminals 13 and 14 and one output terminal 12. This gate is connected to the input terminal 15 through a capacitor 27. The positive voltage is applied to the terminal 15 from the terminal 24 through a resistor 29, whilst 17 indicates the earth connection of the arrangement. After inversion in the inverter 28 a signal from 15 is applied to the input terminal 36 of a Nor-gate 26. The second input of said gate 26 is accessible at 16 for an external connection. The output terminal of the gate 26 is directly connected to the terminal 21 and indirectly (through a non-inverting separator 35) to the terminal 11.

The output 35 is connected to the terminal 20 through a capacitor 30, termed the internal capacitance. The terminal 20 is connected to 16 through an inverter 31. The terminal 20 itself is connected to the terminal 19 through an internal resistance 32. An external capacitor 33 of a value $C_{33}$ and an external resistor 34 of a value $R_{34}$ (indicated by broken lines in FIG. 4*a*) may be connected between 20 and 21 and between 20 and 24 respectively for modifying the unstable period of the monostable circuit. The capacitor 30 of a value $C_{30}$ and the resistor 32 of a value $R_{32}$ form the internal components of the monostable circuit. Different constants can be obtained by establishing the following connections:

by connecting 19 to 24: $\theta=R_{32}\,C_{30}$, by connecting 19 to 24, the capacitor $C_{33}$ being connected between 20 and 21: $\theta=R_{32}\,(C_{30}+C_{33})$, whilst 19 is not connected and 34 is connected between 20 and 24, so that $\theta=R_{34}(C_{30}+C_{33})$.

The latter solution allows an easy adjustment of the duration of the signal and leaves a free choice of the components with respect to their stability characteristics in the interior and to their temperature coefficients. The primary signals are formed by using five monostable circuits $M_1$, $M_2$, $M_3$, $M_4$ and $M_5$, connected as is indicated in FIGS. 1 and 5. The terminals employed only are the terminals 11 to 13 and 16 (FIG. 5). The square-wave signal H(2F1) from the oscillator 1 and having a frequency 2F1 is applied to the terminal 13 of the first monostable circuit $M_1$. The period of these signals is 32 $\mu$sec. The signals $R_1$, derived from the terminal 16, have a period of 32 $\mu$sec., the duration $\theta$ being 3.2 $\mu$sec., coinciding with the signals H. As described above, the duration of these signals depends upon the internal and external components of the monostable circuit $M_1$. The signals $R_1$ are applied to the input 13 of the second monostable circuit $M_2$, which supplies at its output 16 signals $R_2$ whose front flank corresponds with the rear flank of the signals $R_1$ (see FIG. 5). The duration $\theta$ of the signals $R_2$ is 1.5 $\mu$sec., whilst the period is still 32 $\mu$sec. The front flank of the signals $R_2$ is therefore shifted by 3.2 $\mu$sec. with respect to the front flank of the signals H. The signals derived from the output 16 of $M_2$ are applied to the input 13 of the third monostable circuit $M_3$. The front flanks of the signals $P_1$, obtained from the output 16 of $M_3$, coincide with the rear flanks of the signal $R_2$. The duration of the signals $P_1$ is 2.35 $\mu$sec. The signals $P_1$, in turn, are applied to the terminal 13 of the fourth monostable circuit $M_4$, which supplies at its output 16 signals $P_2$ coinciding with the signals $P_1$ and having a duration of 4.7 $\mu$sec. The signals $P_1$ are then supplied to the fifth monostable circuit $M_5$, which supplies signals $P_3$ with a delay of 3.2 $\mu$sec. with respect to the signal H and having a duration $\theta$ of 12 $\mu$sec. Also the cut-off signal $D_4$ is also illustrated, which will finally cut off the signal $P_3$. The values given above have been chosen on the basis of the C.C.I.R. television standard. It will be directly evident that $R_2$ permits of fixing the holding interval $P_1$ the duration of the equalizing pulses, $P_2$ the duration of the line synchronizing pulses and $P_3$ the duration of the line blanking signal. These line blanking signals are obtained by cutting the signals $D_4$, which have to lead with respect to $P_3$ in order to obtain a suitable enclosure. Since the most leading signal is H, $P_3$ is delayed by 3.2 $\mu$sec. In principle, it is sufficient for this delay to be longer than the rise time of $D_4$ and to be shorter than 20 $\mu$sec. The choice of the value of 3.2 $\mu$sec. results of the final processing of the frame synchronizing sequence. According to one feature of the invention the various distortions and the delays introduced by the passages through the various monostable circuits are compensated at the end of the circuit by regulating the time constant, which is carried out by means of a potentiometer. These potentiometers are provided to a number of 5 for the generator assembly.

From the stage 2 the primary signals $P_1$, $P_2$ and $P_3$ are applied to the stage 5 for the formation of the subsequences. However, the signal $P_3$ is passed also to the stage 3, which is formed essentially by a coincidence counter which permits particularly the production of cut-off signals. The coincidence counter 3 is formed by master-slave circuits.

A master-slave circuit designated hereinafter by M–E results of the association of a symmetrical flip-flop and a repeater. A symmetrical flip-flop is a circuit having two stable states, and is capable of maintaining either one or the other of the two states for an indefinite time.

Also in the dividing stage 3 these M–E-circuits are built up as far as possible of And- and Nor-gates. This will be explained with reference to FIGS. 6*a*, 6*b*, 6*c* and 6*d*. FIG. 6*a* shows a repeater combined with a JK–type flip-flop so that finally the arrangement of FIG. 6*c* is obtained. The latter arrangement is used in the dividing stage 3.

In a preferred embodiment of the invention a device is employed whose delay is adjusted automatically for any duration of a signal, so that it is possible to use directly a signal independently of its duration. Such a device is shown in FIG. 6*a*; it will be termed hereinafter a repeater. The signals available at the outputs of the repeater as a function of the input signals are illustrated in FIG. 6*b*. The repeater comprises essentially an asymmetrical flip-flop associated with two coupling circuits to which two binary pulses $E_1=\overline{E}_2$ and the signal $P_3$ of the fifth monostable circuit M5 are applied. It will be supposed that $E_1$ and $E_2$ change their states each time when $P_3=1$ and maintain this state when $P_3$ changes over to 0. $E_1$ and $E_2$ may be supplied, for example, by a symmetrical flip-flop of the JK-mode, indicated by circuits $A_3$, $A_4$, $B_3$, $B_4$ in FIG. 6*c*.

Q*s* and $\overline{Q}s$ indicate the states of the two output terminals of the repeater:

$$\overline{Q}s=\overline{O}s+\overline{P}_3\overline{E}_1=\overline{Q}s+\overline{P}_3\overline{E}_2$$

$$Qs=Qs+\overline{P}_3\overline{E}_2=Qs+\overline{P}_3\overline{E}_1$$

If $P_3=0$. One solution $\overline{Q}s=E_2$ Q*s* *repeat* $E_2$; $Qs=E_1$ Q*s* repeats $E_1$

*If* $P_3=1$ $\overline{Q}s$ and Q*s* remain *un*changed.

When $E_1$ and $E_2$ change their states. Q*s* and $\overline{Q}s$ maintain the memory of the preceding states. From FIG. 6*c* it will be apparent that Q*s* repeats the complement of $E_1$ with a delay equal to the duration of the clock pulse. This also applies to Q*s* which repeats the complement of $E_2$. Consequently, such a device plays the part of an inverter and a delay line.

The combination of a symmetrical flip-flop and a repeater is termed a master-slave circuit ME, which operates as follows:

$P_3=1$ "master" changes its state; "slave" unchanged.
$P_3=0$ "master" unchanged, "slave" reproduces the state of the "master."

The operation may be briefly supposed to be in a figurative sense as follows:

The "master" only speaks when asked: $P_3=1$; the "slave" keeps silence; when no questions are made ($P_3=0$), the "master" keeps silence.
The "slave" can speak, but he can only repeat what the "master" has said.

FIG. 6*c* shows that the outputs Q*s* and $\overline{Q}s$ of the circuit ME are connected to one of the inputs $C_2$ of $B_3$ and $S_2$ of $A_3$ respectively, whilst $B_3$ and $A_3$ are Nand gates. These gates serve as control-sections and the clock pulses are applied to the second inputs of said gates. FIG. 6*c* shows that the "master" is formed by Nand gates $A_4$ and $B_4$, to the inputs of which are applied the output signals of $A_3$ and $B_3$ and the output signals of $B_4$ and $A_4$ respecitvely. The output signals Q*m* and $\overline{Q}m$ of the gates $A_4$ and $B_4$ are applied to one of the inputs of the gates $A_1$ and $B_1$, Or-gates or coupling gates, the other inputs of said gates $A_1$ and $B_1$ being directly connected to the inputs of the clock pulses $P_3$ and $A_3$, $B_3$ respectively. The output signals of the gates $A_1$ and $B_1$ are applied to the repeater, which is essentially formed by the Nor-gates $A_2$ and $B_2$, connected as described above. FIG. 6*d* illustrates the development of the state of the various signals in time. From top to bottom are indicated the clock pulses $P_3$, the signals Q*m*, $\overline{Q}m$, the output signals of the "master" and $Qs=C_2$, $\overline{Q}s=S_2$, the output signals of the ME assembly. This assembly is connected in the JK-mode in order to eliminate some incertainties of the device. Furthermore two improvements are introduced (FIG. 6*b*), which serve to delay and to resume at will the action of the clock pulses by leaving the latter constantly present at the input $P_3$ and by imposing on the outputs Q*s* and $\overline{Q}s$ a given state irrespective of the state of the inputs $P_3$, $S_2$, $C_2$. For this purpose two additional inputs $S_1$ and $C_1$ are used, which act upon the gates $A_3$ and $B_3$ and two additional inputs $S_d$ and $C_d$ which act upon the gates $A_2$ and $B_2$ and which have priority in their action on all other inputs, inclusive of the input $P_3$, when they are complementary. These inputs and their connections are indicated by broken lines. For $C_d=\overline{S}_d$ there is consequently a state of the outputs independent of the state of the inputs; for $C_d=S_d=1$ the operation depends solely on the state of the inputs $P_3$, $C_2$ and $S_2$; for $$C_d=S_d=S_1=C_1=1$$

$S_2=\overline{Q}s$ $C_2=Qs$, $P_3$ being fed by a clock signal: a system connected in the JK-mode, in which the state of the outputs Q*s* and $\overline{Q}s$ is modified at each passage to 0 of the clock pulse. The flip-flop is then used as a binary counter, the counting being adapted to be interrupted when $S_d=C_d=0$, the other conditions remaining the same. Binary counters with zero resetting of this type are used in the coincidence counter 3 (FIG. 1). The clock pulses $P_3$ are applied to the input $P_3$ and the zero-resetting pulses are applied to the input $C_d$. For the sake of simplicity said counters will be represented as in FIG. 8, which shows the portion 3*a* of the counter 3 in a square comprising two input terminals $P_3$ and $C_d$ and two output terminals Q and $\overline{Q}$ and by the choice of the connections: $S_2=\overline{Q}$ $C_2=Q$ $S_1=C_1=S_d=1$. The circuit thus connected will be designated C (counter). This circuit can be reset to zero at any instant in the state $Q=0$ $\overline{Q}=1$ by applying to $C_d$ an appropriate pulse, termed zero-resetting pulse, or briefly zero coincidence ($C_o$).

FIG. 7 shows the development of the states of the various terminals owing to the applied signals. The counting assembly may use 10 elements C (FIG. 8), which choice is determined by the standard, particularly on the basis of the lines to be counted. The inputs $P_3$ are connected in series and the inputs $C_d$ are connected in parallel. This arrangement permits of counting $2^{10}=1024$ pulses. The input $P_3$ of the first counter $C_1$ is connected to the part of the fifth monostable circuit $M_5$ shown in FIG. 1. The outputs Q are connected to the inputs of the following counters. A means for limiting counting to a value $N<1024$ (here 625) consists in applying a zero resetting pulse resulting from the flip-flop assembly. The transmission of this pulse is controlled by the state of an inverter Z, which is practically an And-gate. By starting from an initial state $\overline{Q}=1$, $Q=0$ at the flip-flop assembly, and as an integer number can be decomposed in the sum of integer powers of 2 (for example $$625=2^9+2^6+2^5+2^4+2^0)$$

only the counters $C_{10}$, $C_7$, $C_6$, $C_5$ and $C_1$ are in the initial state at the 625th pulse, or $\overline{Q}=0$, $Q=1$. It is therefore possible to trace the 625th pulse by means of a gate having five inputs, which are connected to the outputs Q of $C_{10}$, $C_7$, $C_6$, $C_5$, $C_1$. The output signal of this gate is termed the coincidence signal $C_{625}$ ($C_{0.625}$). The signal is inverted in I and after a delay in *r* in R it is applied to the zero resetting line with the aid of Z. All flip-flops then return to their initial state. The delay *r* has to be slightly longer than the time of change-over of the flip-flops. The durations of the pulses $C_{625}$ and $C_o$ are automatically adjusted to the value of the delay *r*. In this way accumulation of the periods of propagation through the various flip-flops is avoided, which is otherwise inevitable in the known zero-resetting devices.

FIG. 8 also shows the waveform of the signals $P_3$ and of the coincidence signal $C_{625}$ and $C_o$. It will be apparent that the output $\overline{Q}$ is not employed in this arrangement. In the commutator Z the position 2 corresponds to the connection with $C_{625}$ and the position to the source $+V_{cc}$ of direct voltage.

FIG. 9*a* shows the other part 3*b* of the counter 3 and the And-gates which permit of forming the cut-off signals by other coincidence signals. This formation is performed as explained above. These And-gates are only connected to the outputs Q of the counters C and the symbol $C_3$ indicates, for example, the connection to the terminal Q of $C_3$. The outputs Q could, of course, be employed, if necessary, with an inversion or with the use of a different logical function. From the output of an And-gate intended to furnish a coincidence signal $C_n$, is derived $C_n$ plus a given number of erroneous coincidences necessarily lying between $C_n$ and $C_{625}$; with $C_{10}$ there will, for example, be found ($10=2^3+2^1$) the coincidence $$C_{10}, C_{14}\ (14=2^3+2^1+2^2)$$

and in general all coincidences of the series $$S=2^3+2^1+2^{n1}+2^{n2}+2^{n3} \ldots n1n2n3 \text{ and } S<625$$

The operation of the counter assembly may be recapitulated as follows:

| Counter | Marks | Initial | 624 | 625 | $C_0$ | $C_5$ | $C_{10}$ | $C_{15}$ | $C_{51}$ |
|---|---|---|---|---|---|---|---|---|---|
| $C_1$1 | $2^0$ | 1 | 1 | 0 | 1 | 0 | 1 | 0 | 0 |
| $C_2$2 | $2^1$ | 1 | 1 | 1 | 1 | 1 | 0 | 0 | 0 |
| $C_3$4 | $2^2$ | 1 | 1 | 1 | 1 | 0 | 1 | 0 | 1 |
| $C_4$8 | $2^3$ | 1 | 1 | 1 | 1 | 1 | 0 | 0 | 1 |
| $C_5$16 | $2^4$ | 1 | 0 | 0 | 1 | 1 | 1 | 1 | 0 |
| $C_6$32 | $2^5$ | 1 | 0 | 0 | 1 | 1 | 1 | 1 | 0 |
| $C_7$64 | $2^6$ | 1 | 0 | 0 | 1 | 1 | 1 | 1 | 1 |
| $C_8$128 | $2^7$ | 1 | 1 | 1 | 1 | 1 | 1 | 1 | 1 |
| $C_9$256 | $2^8$ | 1 | 1 | 1 | 1 | 1 | 1 | 1 | 1 |
| $C_{10}$512 | $2^9$ | 1 | 0 | 0 | 1 | 1 | 1 | 1 | 1 |

This table shows the state of the output Q of each of the counters C for the initial state, the pulses 624 and 625, the state of the output Q is the complement of $\overline{Q}$ A graphical representation of the waveform of the various signals is given in FIG. 9*c*; $P_3$ designates the primary signals from the stage 2. $C_{625}$ is the coincidence of the 625th pulse entering the counter, $C_0$ is the initial coincidence the front flank of which corresponds with the rear flank of the 625th pulse; $C_5$, $C_{10}$, $C_{15}$ and $C_{51}$ are the further coicidences.

The duration of a coincidence signal $C_n$ is $H/2$ or H according as $n$ is even or odd-numbered. In this case $C_{n+1}$, an erroneous coincidence of $C_n$, is located immediately after $C_n$. It is, however, always possible to obtain a sole coincidence by using a gate having 10 inputs, receiving signals Q and $\overline{Q}$ as illustrated in FIG. 9*b*. In this figure $\overline{C_7}$ means a connection to the terminal $\overline{Q}$ of the counter $C_7$ of FIG. 8. This arrangement would, however, increase the complexity of the over-all connections. Since practically only the erroneous coincidences of the counter $C_5$ are inconvenient, they are eliminated by a very simple arrangement.

The cut-off pulses are formed in the stage 4 of FIG. 1. It is possible to obtain signals of a width $(n_2-n_1)$H by applying coincidence pulses $C_{n1}$ and $C_{n2}$ to the terminals of an asymmetrical flip-flop as described above.

FIG. 10*a* illustrates the case in which $C_{n1}$ is single and $C_{n2}$ comprises one or more erroneous coincidences $C_{n2+}$. A represents the signals applied to one of the inputs of the flip-flop; B the signals applied to the other input and C the output signals. As shown in FIG. 10*a* the erroneous coincides $C_{n2+}$ are produced after the flip-flop has returned to its initial state. It therefore does not affect the waveform of the output signals.

FIG. 10*b* illustrates the case in which $C_{n1}$ comprises erroneous coincidences of a lower range than those of the sequence $C_{n2}$. The output signals are neither disturbed.

FIG. 10*c* illustrates the influence of the erroneous coincidences on the waveform of the signal to be obtained, when the erroneous coincides do not satisfy the characteristics of the cases A and B.

In the case illustrated in the figure the signals A and B comprise both erroneous coincidences the orders of which overlap each other. At C appear undesirable signals. It is known that particularly the output of the gate forming the coincidences $C_5$ appear erroneous coincidences $C_7$, $C_{13}$ and that at the output of the gate forming the coincidences $C_{10}$ appear erroneous coincidences $C_{11}$, $C_{14}$ . . . It will be apparent that the combination of $C_5$ and $C_{10}$ would lead to an operation similar to that described with reference to FIG 10*c*. It is therefore not possible to obtain the desired signals by applying the coincidence signals $C_5$ and $C_{10}$ to the terminals of an asymmetrical flip-flop.

This is remedied by the cut-off stage 4 shown in FIG. 11. With the aid of a flip-flop $B_1$ first the intermediate signal $I_1$ is formed by applying $C_0$ and $C_5$ to the inputs. The intermediate signal $\overline{I_2}$ is formed by means of a Nor-gate, connected to $P_3$ and $I_1$. Therefore: $I_2=I_1.P_3$. The signals $I_2$ and $C_{10}$ are applied to the flip-flop $B_2$ to form the third intermedite signal $I_3$. The product of $I_1$ and $I_3$ provides the cut-off signal $D_1$ as is illustrated in FIG. 12, and this signal starts at the coincidence $C_5$ and terminates at the beginning of the coincidence $C_{10}$.

On the other hand $C_0$ and $\overline{C_{15}}$ are applied to a flip-flop $B_3$, which supplies the cut-off signals $D_2$. $D_3$ is obtained by applying to the input terminals of a flip-flop $B_4$ the signals $I_2$ and $C_{51}$. It will be apparent from FIG. 12, which illustrates the monitoring and output signals of the cut-off stage 4, that $D_3$ is produced simultaneously with the front flank of the first pulse of $P_3$ and terminates simultaneuosly with the rear flank of the 51th pulse of $P_3$. The duration $D_3$ is therefore $(51-1)$H$/2+d$. Since $d$ is equal to the width of the line blanking signal (12 $\mu$sec.), $D_s=25\text{H}+12$ $\mu$sec., which means that $D_3$ is the frame blanking signal: $D_3=ST$. The cut-off signal $D_1$ is also used in the camera as a starting signal for the frame time-base in the function of frame synchronizing signal $D_1=SyT$. Finally, a counter $C_{11}=SyT$. Finally, a counter $C_{11}$ comprising a flip-flop ME operating as a divide-by-two circuit without zero-resetting ($C_d=1$), furnishes the cut-off signal $D_4$. The signal $D_4$, started by H, leads by 3.2 $\mu$sec. with respect to $P_3$ and encloses $P_3$ and $P_2$. FIG. 13 illustrates the second cut-off stage 5 for the formation of the final synchronizing sequences.

The formation of the frame synchronizing sequence is carried by means of a Nor-gate, to the input of which are applied the signals $P_2$ and $D_1$. The output supplies a subsequence:

$$S'_1=\overline{D_1.P_2}$$

The signals are given a suitable width by means of an asymmetrical flip-flop B, receiving $S'_1$ and $\overline{R_1}$, the delayed signal obtained as described above. The leading edges of $R_1$ lead by 4.7 $\mu$sec. (3.2+1.5) with respect to the leading edges of $P_2$, so that the sequence $S_1$ is composed of signals having a width:

$$D\ \mu\text{sec.}=32-4.7=27.3\ \mu\text{sec.}$$

The width of the signals is therefore adjusted by regulating the monostable circuit $M_1$. The repetition period $H/2=32$ $\mu$sec. is given by a quartz oscillator so that the overall precision of the duration of the frame synchronizing signals P depends only upon the precision of the width of $M_1$ and $M_2$, which has a tolerance of 1.5%, so that $$P\ \mu\text{sec.}=\pm\frac{(3.2+1.5).1.5}{100}=\frac{7}{100}$$

$$P\%=\pm\frac{7}{100\times 27.3}=\pm 0.25$$

The equalization sequence $S_2$ is formed by means of an And-gate having three inputs to which are applied the signals $P_1$, $\overline{D_1}$ and $D_2$. Said gate carries out the operations $S_2=P_1.\overline{D_1}\ D_2$. The line synchronizing sequence $S_3$ is obtained in the same manner by applying to a last And-gate the signals $P_2$, $D_2$, $D_4$ so that $S_3=P_2\ \overline{D_2}\ D_4$.

$D_2$ suppresses the line synchronizing signals during the sequences $S_1$ and $S_2$ (from 0 to 15).

$D_4$ suppresses every other signal in order to re-establish the suitable periodicity. By the passage of the sequences $S_1$, $S_2$, $S_3$ through a gate (Or-gate) the signal Sym is obtained. The line blanking signals $S_4=SL$ is obtained by suppressing every other signal. This operation is carried out simply by applying the signals $D_4$ and $P_3$ to the inputs of an And-gate. The signals $D_3$ and $D_1$ supply the signals ST and SyT. The mixed signal SM is obtained by an Or-operation of the signals $S_4$ and $S_5$.

FIG. 14 resumes the principles of the optimal processing of the various signals.

The above description refers only to a practical embodiment of the invention. This device has the following advantages:

Maintenance of the logical level at any point of the arrangement.

Safe identification of the states corresponding to two discrete values of the electric voltage.

Assembling in any order and in any number.

No limitation in operational speed.

The saturated logical function (state 1=collector voltage of a cut-off transistor; state 0=saturated transistor) permits of maintaining a logical level near the supply voltage.

Noise immunity is indicated by the maximum noise voltage beyond which the system mixes the noise B with a signal of normal logical level N. It is known that the noise immunity value is the higher, the higher is the logical level. The noise immunity is higher than or equal to 400 $\mu$v. under the most unfavourable conditions.

The choice of the saturated logical function permits of obtaining a speed limited only the storing time of the transistor, which varies between 20 and 100 $\mu$sec. This does not involve problems, since the highest clock frequency of the generator is 31,250 c./s., whereas the most rapid signals to be processed have a duration of 1.5 $\mu$sec. The total number of integrated circuits employed is 35 and the number of discrete components is 19, of which 15 are used as time-constant elements in the monostable circuits.

The overall volume of the generator is 150 cms.$^3$, as compared with 1000 cms.$^3$ of a generator of the same type employing discrete micro-components.

The current consumption of the generator is about 2$w$.

The generator is automatically adjusted. The signals (phase, duration) are adjusted by means of five independent potentiometers.

The reduction in weight is of the order of 2 to 1, which is interesting for a portable device.

The reliability and the safety in operation are considerably superior to those of an assembly of discrete components, since in the case of discrete elements the dependence upon temperature is different. With integrated circuits arranged on a single wafer the temperature dependence is the same.

Finally the construction of such a generator is comparatively simple and this simplicity becomes manifest at any level of the production (supply, storing, input checking, wiring, final check, tests). As stated above, according to the idea of the invention, a maximum use is made of And-, Nand-, Or-, and Nor-gates which are anywhere available in the integrated form.

The present invention is, of course, not at all restricted to the embodiment described above by anyone skilled in the art who wants to synchronize signals according to any standard and in general for all classical processings of electrical signals. It permits of obtaining easily the intersynchronisation of the generator with a reference generator.

What is claimed is:

1. A generator for the formation of television synchronizing signals by means of square-wave signals of substantially constant frequency, termed herein clock signals, characterized in that the generator comprises the following stages:

(a) a delay stage comprising five monostable multivibrators composed each of an And-gate, a phase inverter and a Nor-gate and each comprising the required RC-elements for adjusting the desired delay period for each monostable multivibrator, whilst the first and the second multivibrators are connected in series and the output of the second multivibrator is connected to the input of the third and of the fourth multivibrators and the output of the first multivibrator is also connected to the input of the fifth monostable multivibrator, whilst the square wave signal (H2F1) is applied to the input of the first multivibrator, (b) a dividing stage comprising a plurality of counters composed of Nand- and Or-gates, the input of which is connected to the output of the fifth multivibrator and the five outputs of which are connected to five inputs of (c) a first cut-off stage having a sixth input to which the square-wave signal is applied and a seventh input, connected to the output of the fifth multivibrator and having six outputs, five of which are connected to five inputs of (d) a second cut-off stage comprising a Nand-gate, three And-gates and a flip-flop circuit, whilst the two inputs of the Nand-gate are connected to the first output of the first cut-off stage and the output of the fourth monostable multivibrator respectively, whereas the output of the Nand-gate is connected to the first input of the flip-flop circuit to the other input of which is applied the inverted output signal of the first monostable multivibrator, whilst the three inputs of the first And-gate are connected to the output of the third monostable multivibrator and to the second and third outputs respectively of the first cut-off stage and furthermore the three inputs of the second And-gate are connected to the output of the fourth multivibrator and to the fourth and to the sixth outputs respectively of the second cut-off stage, whilst finally the two inputs of the third And-gate are connected to the output of the fifth multivibrator and to the sixth output of the second cut-off stage respectively and the first of the four outputs of the second cut-off stage is formed by the output of the flip-flop circuit, the second by the output of the first, the third by the output of the second and the fourth by the output of the third And-gate, whilst, the four outputs lead to (e) an adding stage comprising two Or-gates, in which the three inputs of the first Or-gate are connected to the three first outputs of the second cut-off stage, whereas the two inputs of the second Or-gate are connected to the fourth output of the second cut-off stage and the fifth output of the first cut-off stage, whilst the output of the first Or-gate supplies the over-all television synchronizing signal and the output of the second Or-gate furnishes the frame- and line-blanking signals.

2. A generator as claimed in claim 1 characterized in that the dividing stage comprises two halves, the first half having ten series-connected counting circuits, to the first of which is applied the signal of the fifth multivibrator and each pulse counting circuit comprises a master-slave circuit and an And-gate, forming part of said first half, has five inputs which are connected to outputs of the first, the fifth, the sixth, the seventh and the tenth counter respectively and the output of said And-gate is connected through a phase inverter and a delay element having an appropriate delay period, if necessary, through a switch to interconnected inputs of the ten counting circuits, which interconnection forms at the same time a first output of the dividing stage, whereas the second half of the dividing stage is formed by four And-gates, the two inputs of the first And-gate being connected to the respective outputs of the first and the third counters, the two inputs of the second And-gate being connected to the respective outputs of the second and the fourth counters, the four inputs of the third And-gate being connected to the respective outputs of the first, the second, the third and the fourth counters and the four inputs of the fourth And-gate being connected to the respective outputs of the first, the second, the fifth and the sixth counters and the five outputs of the dividing stage being formed, apart from said interconnection, by the four outputs of the four And-gates.

3. A generator as claimed in claim 1 characterized in that the logical circuit employed is formed by a saturated diode-transistor circuit.

4. A generator for synchronizing signals as claimed in claim 1, characterized in that the circuits employed are integrated monolithic circuits.

5. A generator as claimed in claim 1 in which the duration of the pulse to be obtained is longer than or equal to half the repetition period of the cut-off signal, characterized in that the subsequence is obtained by composing the said cut-off signal and an inter-sequence in a master-slave flip-flop circuit.

6. A generator as claimed in claim 1 characterized in that signals having a delay T*r* and a period T are obtained by applying a signal A of a period T and of a signal having a period T*r* and a delay *r* with respect to the signal A to the inputs of an asymmetrical flip-flop circuit.

7. A generator as claimed in claim 5 characterized in that the counter is formed by master-slave flip-flop circuits, the main inputs of which are connected in series, whereas the monitoring inputs are connected in parallel so that resetting to zero becomes possible by applying a single pulse resulting from the state of the over-all flip-flop circuits to said monitoring inputs.

References Cited

UNITED STATES PATENTS 3,408,459 10/1969 Lehnert.
3,454,722 7/1969 Jousset et al.

RICHARD MURRAY, Primary Examiner

R. P. LANGE, Assistant Examiner